UNITED STATES PATENT OFFICE.

FRANK G. PERKINS, DECEASED, LATE OF LANSDALE, PENNSYLVANIA, BY GERTRUDE S. PERKINS, EXECUTRIX, OF SOUTH BEND, INDIANA, ASSIGNOR TO PERKINS GLUE COMPANY, A CORPORATION OF PENNSYLVANIA.

VEGETABLE GLUE.

1,078,691.     Specification of Letters Patent.     Patented Nov. 18, 1913.

No Drawing.     Application filed March 16, 1912. Serial No. 684,297.

*To all whom it may concern:*

Be it known that FRANK G. PERKINS, deceased, late a citizen of the United States, and a resident of Lansdale, borough of Lansdale, State of Pennsylvania, did invent certain new and useful Improvements Relating to Vegetable Glue, of which the following is a specification.

The invention relates to improvements in the making of glue such as is suitable for gluing up veneers, from vegetable carbohydrates.

The invention is more particularly directed to improvements in, or modifications of, the processes and products described in Reissue Letters Patent No. 13,436 and Letters Patent No. 1,020,656. In those patents there were described certain methods for producing a vegetable glue, suitable for gluing up veneers, in which a starchy carbohydrate base was treated to reduce the water absorptive powers thereof and properly proportion the viscosity, cohesiveness and adhesiveness resulting when the carbohydrate was suitably dissolved to form glue. However, in those processes as generally carried out, the resulting glue base consisted chiefly of a carbohydrate in which all of the material had been treated to the same extent by the process there described, to secure this proper proportioning. In some cases such a method is impracticable or impossible owing either to local circumstances and conditions or owing to high cost. The improved process and product herein described is designed to avoid such disadvantages, and furthermore, it is designed to make useful and available for the making of a wood glue, those factory lots of material which, owing to the carelessness of the workmen, or to other causes, may have been excessively treated or otherwise damaged for the use or making of glue by themselves. The improvements herein described are therefore not mainly for the purpose of producing a better glue than described in those co-pending applications, but rather are designed to provide a cheaper process and product which may be more easily and successfully carried out, or to utilize waste material, to produce a glue of the same quality.

One main feature of the improvements herein described consists in the proper proportioning of the viscosity, cohesiveness and adhesiveness of the glue base when properly put into solution with the aid of caustic soda or other suitable solvent of cellulose, by the blending of products having different, and in themselves undesirable, qualities, so that if they were so dissolved separately the resulting products would have an undesirable relative viscosity, cohesiveness and adhesiveness, and the carrying out of the blending in such a manner and with such proportions that the relative viscosity, cohesiveness and adhesiveness of the resulting mixture when dissolved, shall be properly proportioned, partly by averaging, and also, it is believed, partly by the interaction of the constituents themselves.

In the process described in the said Reissue Letters Patent No. 13,436, all the material is affected by the preliminary treatment, so that it is believed the mean polymerization of the starch is so altered as to properly proportion the physical properties of the base when suitably dissolved. It is not yet certain but that small quantities of dextrin may possibly be formed in said process which unite in some way (as solid solution or colloidal aggregate) with unaltered or partly altered starch stuff of the granule, but this is not believed to be the case. When, however, the starch or other carbohydrate is dissolved in caustic or similar solvent, various carbohydrate aggregates form with water and caustic alkali a colloidal aggregate, the viscosity of which is generally believed to be dependent on the degree of polymerization, which degree is not thought to be uniform in the colloids (like that of crystalline bodies having a fixed molecular weight), but to be rather the mean degree of more or less widely divergent atomic groups united in considerable numbers into cumbrous colloidal aggregates having mean physical properties. As the colloidal state of the finished glue is produced during the making of the batches liquid by means of caustic and water, it is believed that any mixture of different carbohydrates adapted to form with one another and with the caustic and the water when colloidally united, a product or compound having a proper mean polymerization without too great diversity of its constituents, will yield a glue having the desired relative viscosity, cohesiveness and adhesiveness, the one to the other, required to produce a satisfactory glue for gluing up veneers.

It is believed to be immaterial, considering the mean molecular weight or polymerization of the desired resulting product, whether a large part of the base has a condition of slightly lower molecular weight and a small part of the base has a molecular weight very much higher, or whether a small part of the base has a molecular weight very much lower and a relatively larger part of the base has a molecular weight only slightly higher than that desired as the mean state of polymerization, or whether nearly equal portions of the carbohydrates are used, one of which is only slightly higher in degree of polymerization or molecular weight, and the other is only slightly or equally lower in degree of polymerization or molecular weight.

Having now described some of the principles upon which this invention is based, certain examples of preparing a glue base in accordance with this invention will be given, from which anyone skilled in the art will be able to carry out the processes and produce products in accordance with this invention.

Example 1: A glue base may be made by the proper mixture of raw cassava starch and potato dextrin, or British gum, or commercial corn dextrin. To do this take good, fresh cassava starch such as would be obtained from the cassava plant grown in Florida by washing, grinding, sieving, rewashing and tabling, and then drying the same, using about two quarts of dry caustic soda 76° to each 2000 lbs. of starch in the rewashing water and also using about 2 lbs. of bluestone or copper sulfate with all waters used, to each 2000 lbs. of starch for the purpose of preventing undue bacterial action. With 70 parts of the cassava starch or flour thus prepared, mix 30 parts by weight of the best commercial corn dextrin as regularly marketed in this country. The mixture may be made during, or just before, the drying process of the starch, but in mixing with dextrin it is preferred to mix it with the starch after the starch has dried, using finely powdered dextrin, and making the mixture as intimate as possible with ordinary mechanical means. In this example it will be observed that a large quantity of unconverted or unchanged starch and a small quantity of highly altered or almost completely converted starch (i. e. dextrin), have been used, thus combining two unequal portions of products, one of which (a much larger quantity) has an extremely high degree of polymerization, and the other (a much smaller quantity) has an extremely low degree of polymerization. With different cassava flours which have been used as low as 5% and as high as 75% of commercial corn dextrin has been taken to produce glue bases in which the relative viscosity, cohesiveness and adhesiveness would be properly proportioned when the base was dissolved to form glue. But for the manufacture of good glues suitable for gluing up veneers, it is preferred to use about 30% of corn dextrin when mixing with such a grade of cassava starch as described above. Slightly more or less of potato dextrin or British gum than of corn dextrin, would be used, but the different varieties of dextrin obtainable on the market seem to produce less difference in the results than do the various starches, so that the substitution of one dextrin for another does not generally make as much difference as the substitution of one starch for another.

Example 2: Sago flour may be used instead of using cassava, and in that case about 40% of commercial corn dextrin is used instead of 30%. The mixture is made in substantially the same way as described above, but when suitably dissolved with water and caustic the glue is not quite as permanently fluid as the glues produced by other mixtures, since it tends to gelatinize more readily.

Example 3: Sago flour may be treated with chlorin or alkaline hypochlorites, acids etc., to alter it and thereby, it is believed, render it lower in its degree of polymerization. For instance, it may be heated with 1/2 of 1% of hydrochloric acid while stirring in about 14° Baumè suspension in water, and to this mixture 1/6 its volume of fresh solution of bleaching powder in water may be added, the whole being stirred together intermittently for 48 hours and neutralized with NaOH, after which 1/2% NaOH in 16 parts of water and 1/4% of $Na_2O_2$ in 32 parts of water may be added, and later enough HCl to neutralize the batch. If, when washed and dried, this product is mixed up with 9 times its own weight of water, and boiled up with live steam at 100 lbs. pressure for 10 minutes, the resulting hot liquid will have a viscosity to flow through a small orifice (Perkins's viscosimeter) about 15/16 as great as that of cold water, evidencing, it is believed, a very considerable depolymerization or degradation of the starch molecules. In order to make a usable glue base with such a product 15 parts of it may be mixed with 43 parts of raw cassava flour as sold on the market under the grade M—4, and also 42 parts its weight of glue base such as produced by the process set forth in said Reissue Letters Patent No. 13,436, carrying said process to the point where the viscosity of the product in the 9 to 1 boil-up has been reduced to 18 seconds, in Perkins's viscosimeter. The resulting mixture of the three different kinds of treated amylaceous matter, will, when properly dissolved or treated with a solvent of cellulose and water, give a very satisfactory wood glue. It is to be observed that in this case equal parts of an overtreated product and a product not treated, and a different product much too depolymerized, have been mixed to produce a product, the mean polymerization of which when dissolved, will be that desired to produce a glue suitable for gluing up veneers.

Example 4: In this example the said acid process as set forth in said Reissue Letters Patent No. 13,436, is applied to cassava flour, M—4, and extended to such a point that the viscosity test with Perkins's viscosimeter, made with the 9 to 1 boil-up, as described in said Reissue Letters Patent, shows a viscosity equal to 21/16 that of water. Such a product would be regarded as having been overtreated, so that it is unsuitable for use alone in making glue. If, however, equal parts of this overtreated product and of raw cassava of grade M—4 be thoroughly mixed together, the resulting mixture will be found to have a satisfactory mean polymerization, and be satisfactory as a glue base to be dissolved with caustic soda and 2½ parts of water.

Various other starches such as that known in Florida under the name of Comptie starch, potato starch, &c., may be similarly used. The mixing together, for the purpose of proportioning the mean polymerization to produce the necessary relative viscosity, cohesiveness and adhesiveness of the resulting product, may be done with the starches when dry, if the mixture is very thoroughly carried out. It is preferred, however, to do the mixing in the wet state, after such processing or other preliminary treatment to which the starch has been subjected (except where dextrin is being used), as under these circumstances the starch is completely distributed throughout the liquid, and the different kinds can thus be mixed together more thoroughly, and furthermore, as during the process of separation of the liquid and the subsequent processes of drying and preparation for shipment, the mixture is continually made more and more thorough.

Example 5: High grade cassava flour treated by the acid process as described in said Reissue Letters Patent 13,436, but in which the process has been carried somewhat too far so that the viscosity shown by Perkins's viscosimeter on the 9 to 1 boil-up is 22 seconds as compared with 16 seconds for water, is mixed with an equal weight of the same cassava treated in accordance with the preliminary treatment described in said Letters Patent No. 1,020,656, but in which, however, the treatment has only been carried sufficiently far to reduce the viscosity as tested by the said 9 to 1 boil-up, to from 70 to 90 seconds, and not far enough to produce a satisfactory glue. One of these products, it will be observed, has not been sufficiently treated to make a satisfactory glue, whereas the other has been too much treated to give the desired result. If, however, the two are mixed in equal proportions a glue base will be produced which upon being dissolved as hereafter described, will produce a satisfactory glue having substantially the final adhesiveness of good animal glue, and suitable for gluing up veneers.

It is desirable here to point out that the mean viscosity secured is not exactly the average of the two viscosities which are characteristic of the two different materials. Thus it would be expected from the proportions used that a mean viscosity in the neighborhood of 50 would be secured, whereas the viscosity of the resulting product actually secured in the cases where this has been tried, has been slightly different than would be expected. It is from such facts that it is believed that some other reaction or grouping takes place while the starch grains are undergoing the process of combination with caustic and water to form the viscous colloid which constitutes the glue.

Example 6: It has been found by experience that if the preliminary treatment of the acid process, as described in said Reissue Letters Patent No. 13,436, has been carried too far in the treatment of cassava, grade M—4, so as to produce a product which, in the 9 to 1 boil-up, showed, in Perkins's viscosimeter, a viscosity of 20 seconds as compared with water at 16 seconds, such a product could still be made available for the making of a good glue by taking 3 parts of this overtreated acid process product and mixing it with two parts of raw cassava, grade M—4, and with 5 parts of glue base produced in accordance with the process set forth in said Letters Patent 1,020,656, in which the treatment has been carried to such a point that the 9 to 1 boil-up shows a viscosity of 34 seconds, in Perkins's viscosimeter. The resulting 10 parts of glue base when thoroughly mixed together and dissolved as above described, produce a glue having a desired consistency and flowing qualities such as would be obtained with either of the glue bases prepared from cassava starch alone, by the processes as described in either of said co-pending applications. In putting into solution such composite glue bases, it is preferred to use no heat, but instead a slightly increased portion of a solvent of cellulose, as caustic soda, i. e., instead of using 110° Fahrenheit and about 7% by weight of the glue base of caustic, about 8% or 10% 76° caustic similarly dissolved in from 2 to 3 parts of water, is used. This diluted caustic soda solution is added slowly with continued stirring until the mixture is observed to come across or pass over from a mixture of starch suspended in water and caustic to a homogeneous colloidal solution of starch, water and caustic.

During the earlier stages of the addition of caustic little difference in appearance of the mass has been apparent. Soon, however, it becomes creamy and more pasty and difficult to stir. When about half of the caustic has been added there has been observable a minute mottled effect on the surface of the batch which gradually assumes a translucent porcelain-like appearance. If, at this time, a little of the mixture was squeezed between glass plates, portions of the mixture were observed to be transparent and almost invisible, while other portions presented much the appearance of the original mixture of starch suspended in water. As the addition of caustic proceeded accumulations of clearer matter occurred on the sides of the vessel and stirrers, and finally when the proper amount of caustic had been added the entire mass passed over to a homogeneous colloidal compound of starch, caustic and water. A little excess of caustic may be added to prevent decomposition of the compound by carbonic acid or moisture of the air.

It will be apparent from all these examples that the present process for preparing carbohydrates in order to properly proportion the viscosity, cohesiveness and adhesiveness of the product obtained when that product shall be dissolved in a suitable solvent of cellulose to form a semi-fluid glue, differs from the two processes as more generally carried out by the particular methods described in said Letters Patent in that, as more generally carried out the treatment applied to the raw material whatever it may be, in order to make the glue base, is substantially the same treatment applied to each particle of the raw material, and the glue base when made consists of a number of particles each of which is modified or changed in substantially the same manner, and consequently any portion of the resulting base might be taken to make the glue by dissolving, whereas in the present process several series of different kinds of particles are mixed, each of a different kind, one or more of which by itself would not be capable of producing a satisfactory glue. Or the process of adjustment or proportioning of viscosity, cohesiveness and adhesiveness may be said to consist in this case, not in the precisely limited treatment of every particle of the material, but in the precise or proper proportioning of the amount of differently treated material used to make up the glue base.

It will be apparent that the invention is not limited to the use of any particular grade or quality of raw material, nor to any specific proportions in the admixture of these raw materials. Different carbohydrates may be used, as for instance dextrin used with starch, cellulose used with starch, cellulose used with dextrin, or any of the various degeneration products obtainable from any of the carbohydrates may be used, the proper proportions of which will be readily ascertained from the foregoing by those skilled in the art, so that when the finally mixed product shall be put into solution with a suitable solvent of cellulose and about 3 parts of water or less the resulting product or compound shall be a thick slow flowing semi-fluid mass exhibiting a quick tack and the ability to hair out in long fibers when freshly moistened surfaces are separated, exhibiting when quickly separated, a crackling sound, and capable of flowing through pipes and spreading by machinery and capable of joining two surfaces of wood when properly applied and dried with a layer having a greater cohesive and adhesive strength than the mean lateral strength of the wood.

Having thus fully and clearly described the invention and given a number of specific examples by which the invention may be carried out and its nature understood, what is claimed and desired to be secured by Letters Patent is:

1. The process of making a base for wood glue, which consists in taking a carbohydrate the viscosity of which, when dissolved in about 3 parts of water and caustic soda, is too great to produce a satisfactory glue, and mixing therewith a carbohydrate, the relative viscosity, cohesiveness and adhesiveness of which when so dissolved in the same manner, is unsatisfactory for glue, in proportions such that the relative viscosity, cohesiveness and adhesiveness of the resulting mixture when so dissolved in the same manner, are properly proportioned to produce a semi-fluid glue suitable for gluing up veneers.

2. The process of making a base for wood glue, which consists in taking two or more starchy carbohydrates, one or more of which, when dissolved in about 3 parts of water and caustic soda, has a viscosity greater than that desired in the final glue, and one or more of which, when so dissolved in the same manner, has a viscosity less than that desired in the finished glue, and mixing said carbohydrates in proportions approximately inverse to the relative differences in viscosity said carbohydrates have when so dissolved in the same manner, from the desired resulting viscosity of the mixture when so dissolved in the same manner, to produce a semi-fluid glue suitable for gluing up wood veneers.

3. The process of making a base for glue, which consists in taking a plurality of starchy carbohydrates, one or more of which, when dissolved in about 3 parts of water and caustic soda, has a viscosity greater than that desired in the resulting glue, and one or more of which carbohydrates, when so dissolved, has a viscosity less than that desired in the finished glue, and a relative viscosity, cohesiveness and adhesiveness which is unsatisfactory for woodwork, and mixing said carbohydrates in proportions to produce a semi-fluid glue capable of being applied by machinery and suitable for gluing up veneers.

4. The process of making wood glue, which consists in taking a plurality of starchy carbohydrates, one or more of which, when dissolved in about 3 parts of water and caustic soda, has a relative viscosity greater than that desired in the final glue, and one or more of which, when so dissolved in the same manner, has a relative viscosity, adhesiveness and cohesiveness unsatisfactory for gluing up veneers, and mixing said carbohydrates in proportions such that, when so dissolved in the same manner, the resulting product will have a relative viscosity, cohesiveness and adhesiveness suitable for gluing up veneers, and then dissolving the mixture in about 3 parts of water or less and caustic, to form a semi-fluid glue capable of being applied by machinery.

5. A wood glue base, consisting of a mechanical mixture of different carbohydrates, one or more of which, dissolved in about 3 parts of water and caustic soda, has a viscosity greater than that desired in the final glue, and one or more of which when so dissolved in the same manner, has a relative viscosity, adhesiveness and cohesiveness unsatisfactory for gluing up wood veneers, the proportions of said carbohydrates being such that the relative viscosity, cohesiveness and adhesiveness of the resulting mixture, when so dissolved in the same manner, is suitable for gluing up veneers.

6. A wood glue base, consisting of a mechanical mixture of different starchy carbohydrates, one or more of which when dissolved in about 3 parts of water and caustic soda, has a viscosity greater than that desired in the final glue, and one or more of which when so dissolved in the same manner, has a relative viscosity, adhesiveness and cohesiveness unsatisfactory for gluing up veneers, and one or more of which, when so dissolved in the same manner, has a relative viscosity, cohesiveness and adhesiveness suitable for gluing up veneers, the proportions of said carbohydrates being such that the relative viscosity, cohesiveness and adhesiveness of the resulting mixture, when so dissolved in the same manner, is suitable for gluing up wood veneers.

7. A wood glue base embracing a mechanical mixture of raw starch and soluble starch in proportions such that, when the mixture is dissolved in about 3 parts of water and caustic soda, the resulting mixture will have a relative viscosity, cohesiveness and adhesiveness such that it is capable of being applied by machinery and suitable for gluing up veneers.

8. A semi-fluid colloidal vegetable glue having substantially the adhesiveness of the best animal glue, and capable of producing a joint between pieces of wood stronger than the mean lateral strength of the wood, and consisting essentially of starch combined by about 3 parts of water or less and caustic alkali with dextrin.

9. A vegetable glue having substantially the adhesiveness of good animal glue and capable of producing a joint between pieces of wood stronger than the mean lateral strength of the wood, and consisting essentially of a colloidal compound of two or more different carbohydrates, one or more of which, dissolved in about 3 parts of water and caustic soda, has a viscosity greater than that desired in the final glue, and one or more of which when so dissolved in the same manner, has a relative viscosity, adhesiveness and cohesiveness unsatisfactory for gluing up veneers, the proportions of said carbohydrates being such that the relative viscosity, cohesiveness and adhesiveness of the resulting mixture, when so dissolved in the same manner, is suitable for gluing up veneers.

10. A vegetable glue capable of producing a joint between pieces of wood, stronger than the mean lateral strength of the wood, and consisting essentially of a colloidal compound of a plurality of different starchy carbohydrates, one or more of which dissolved in about 3 parts of water and caustic soda, has a viscosity greater than that desired in the final glue, and one or more of which when so dissolved in the same manner, has a relative viscosity, adhesiveness and cohesiveness unsatisfactory for gluing up veneers, and one or more of which, when so dissolved in the same manner, has a relative viscosity, cohesiveness and adhesiveness suitable for gluing up veneers, the proportions of said carbohydrates being such that the relative viscosity, cohesiveness and adhesiveness of the resulting mixture, when so dissolved in the same manner, is suitable for gluing up veneers.

11. The process of making wood glue which consists in combining two or more different starchy carbohydrates with about 25% or more of their weight of water and about 4% or more of their weight of caustic alkali to form a colloidal compound, and regulating the relative cohesiveness, adhesiveness and viscosity of the resulting compound by adjustment of the proportions of the various carbohydrates, to produce a semi-fluid glue having when suitably applied and dried a tensile and adhesive strength superior to the mean lateral strength of the wood and having a viscosity suitable for application by machinery.

12. A vegetable glue consisting essentially of a colloidal compound, with about 3 parts of water or less and caustic soda, of two or more starchy carbohydrates, one or more of which dissolved in about 3 parts of water and caustic soda, has a viscosity greater than that desired in the final glue, and one or more of which when so dissolved in the same manner has a relative viscosity, adhesiveness and cohesiveness unsatisfactory for gluing up veneers, the proportions of said carbohydrates being such that the relative viscosity, cohesiveness and adhesiveness of the resulting mixture, when so dissolved in the same manner, is suitable for gluing up veneers.

13. A wood glue base, consisting of a mechanical mixture of different carbohydrates, one or more of which are derived from the cassava plant, and one or more of which, dissolved in about 3 parts of water and caustic soda, has a viscosity greater than that desired in the final glue, and one or more of which when so dissolved in the same manner, has a relative viscosity, adhesiveness and cohesiveness unsatisfactory for gluing up wood veneers, the proportions of said carbohydrates being such that the relative viscosity, cohesiveness and adhesiveness of the resulting mixture, when so dissolved in the same manner, is suitable for gluing up veneers.

14. A wood glue base, consisting of a mechanical mixture of starchy carbohydrates, one or more of which, dissolved in about 3 parts of water and caustic soda, has a viscosity greater than that desired in the final glue and one or more of which when so dissolved in the same manner has a relative viscosity, adhesiveness and cohesiveness unsatisfactory for gluing up wood veneers, the proportions of said carbohydrates being such that the relative viscosity, cohesiveness and adhesiveness of the resulting mixture, when so dissolved in the same manner, is suitable for gluing up veneers.

In testimony whereof I have signed my name to this specification in the presence of two subscribing witnesses.

GERTRUDE S. PERKINS,
*Executrix of the estate of Frank G. Perkins.*

Witnesses:
GORHAM CROSBY,
EDWIN SEGER.